United States Patent
Berding et al.

(10) Patent No.: US 7,385,784 B1
(45) Date of Patent: Jun. 10, 2008

(54) DISK DRIVE COVER WITH TOP AND BOTTOM LAYERS ELECTRICALLY GROUNDED WITH FIRST AND SECOND FLAPS AND METHOD OF MANUFACTURING THE SAME

(75) Inventors: Keith R. Berding, San Jose, CA (US); Gabriel F. Camara, San Jose, CA (US); Pang Choun Cheong, Singapore (SG)

(73) Assignee: Western Digital Technologies, Inc., Lake Forest, CA (US)

( * ) Notice: Subject to any disclaimer, the term of this patent is extended or adjusted under 35 U.S.C. 154(b) by 673 days.

(21) Appl. No.: 10/976,502

(22) Filed: Oct. 29, 2004

(51) Int. Cl.
*G11B 33/14* (2006.01)
(52) U.S. Cl. .................................. 360/97.02
(58) Field of Classification Search ............... None
See application file for complete search history.

(56) References Cited

U.S. PATENT DOCUMENTS

| | | | |
|---|---|---|---|
| 5,214,549 A | | 5/1993 | Baker et al. |
| 5,666,239 A | * | 9/1997 | Pottebaum ............... 360/97.03 |
| 6,469,864 B2 | | 10/2002 | Kamezawa et al. |
| 6,501,614 B1 | | 12/2002 | Kang et al. |
| 6,525,931 B2 | | 2/2003 | Yagenji et al. |
| 6,529,345 B1 | | 3/2003 | Butler et al. |
| 6,661,603 B1 | | 12/2003 | Watkins et al. |

* cited by examiner

*Primary Examiner*—David Davis
(74) *Attorney, Agent, or Firm*—Stetina, Brunda, Garred & Brucker

(57) ABSTRACT

There is provided a disk drive cover. The disk drive cover includes a bottom layer including a metallic bottom layer body and a first flap formed in the bottom layer body. The first flap defines an exposed inner body edge of the bottom layer body. The disk drive cover further includes a damping layer. The disk drive cover further includes a top layer including a metallic top layer body and a second flap. The second flap is formed in the top layer body with the second flap extending into the bottom layer adjacent the first flap. The second flap defines an exposed second flap edge. The second flap edge is disposed in mechanical communication with the exposed inner body edge for electrically grounding the top and bottom layers.

12 Claims, 3 Drawing Sheets

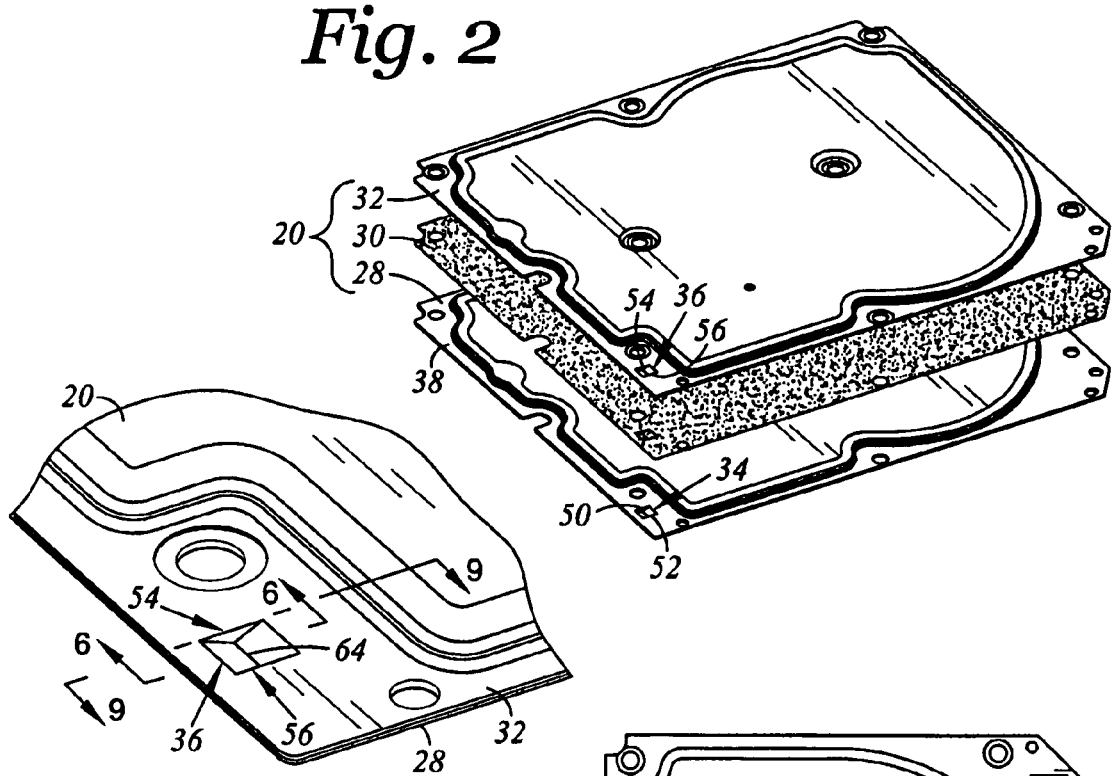
Fig. 2
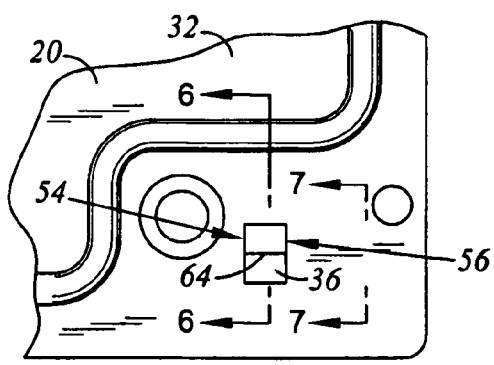
Fig. 3
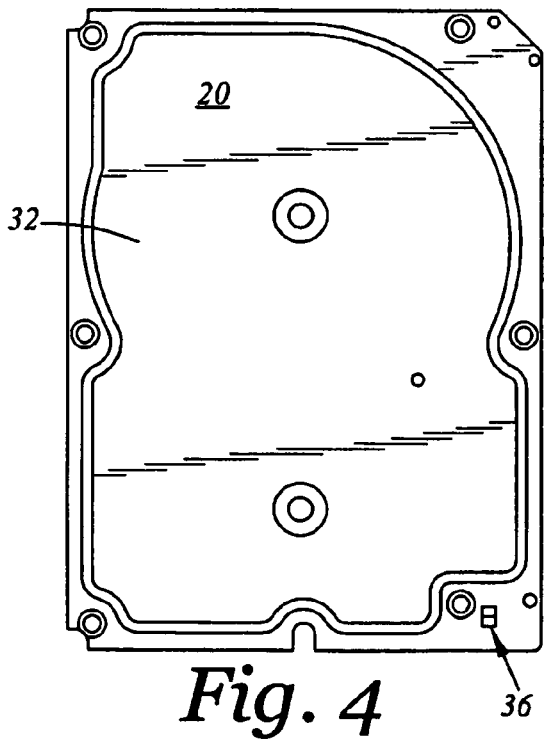
Fig. 4
Fig. 5

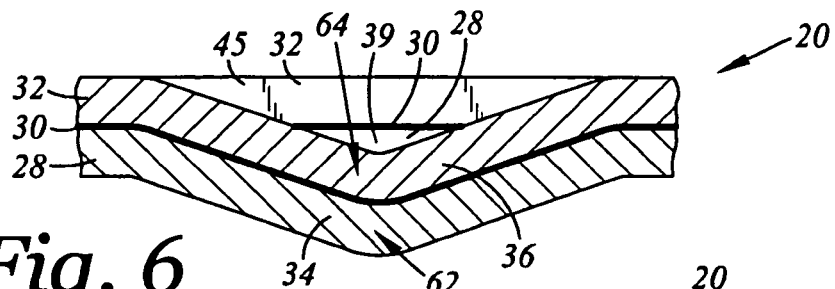
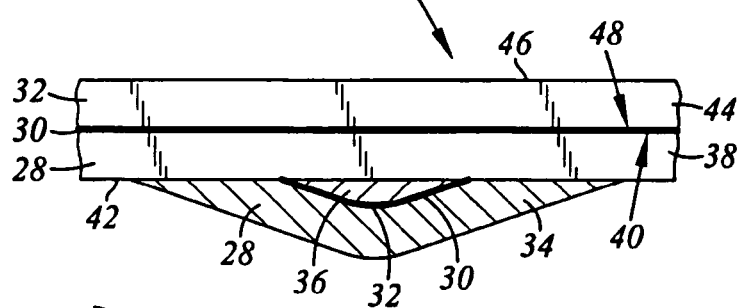
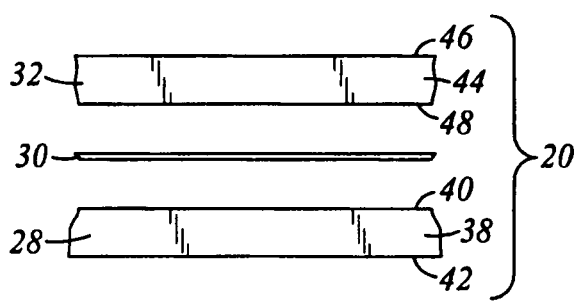
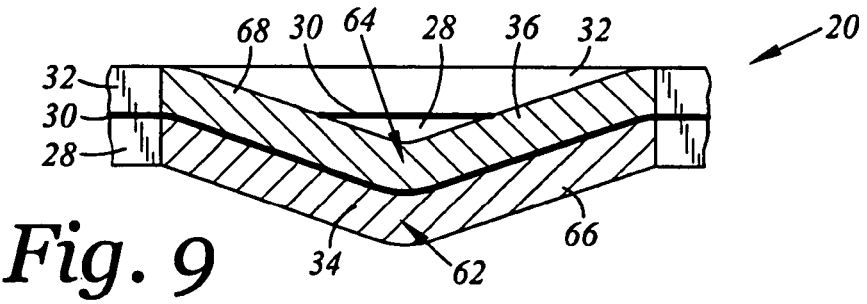
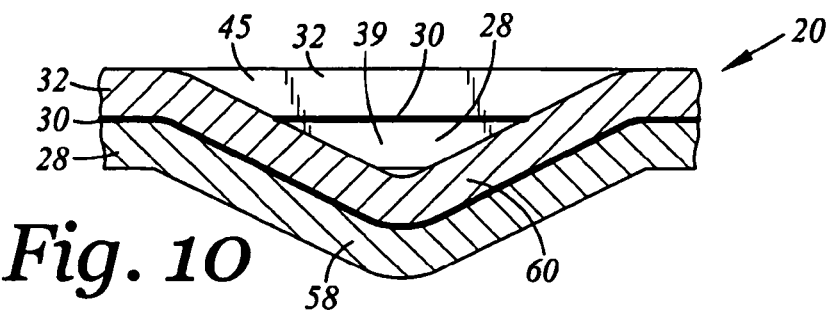

DISK DRIVE COVER WITH TOP AND BOTTOM LAYERS ELECTRICALLY GROUNDED WITH FIRST AND SECOND FLAPS AND METHOD OF MANUFACTURING THE SAME

BACKGROUND OF THE INVENTION

1. Field of the Invention

The present invention relates generally to disk drives, and in particular to a disk drive cover with top and bottom layers electrically grounded with first and second flaps, and a method of manufacturing the same.

2. Description of the Prior Art

The typical hard disk drive includes a head disk assembly (HDA) and a printed circuit board assembly (PCBA) attached to a disk drive base of the HDA. The head disk assembly includes the disk drive base, a cover, at least one magnetic disk, a spindle motor for rotating the disk, and a head stack assembly (HSA) that includes a transducer head supported by a slider for reading and writing data from and to the disk.

The spindle motor includes a spindle motor hub that is rotatably attached to the disk drive base and supports at least one disk. The head stack assembly includes an actuator assembly including the sliders and a flex circuit cable assembly attached to the actuator assembly. The actuator assembly includes an actuator that is rotatably coupled to the disk drive base and is used to read and write data from and to the disk. A plurality of fasteners, such as metal screws, are disposed about a periphery of the disk drive cover and engage the periphery of the disk drive base for attachment of the disk drive cover with the disk drive base. In addition, as support for the actuator, a fastener is engaged to a pivot bearing cartridge through the disk drive cover. Another fastener is used to support the spindle motor and is engaged to the spindle motor also through the disk drive cover.

A topic of concern is mitigating the effects of various vibrations within the disk drive due to the many dynamic components. In this regard, disk drive cover designs have included a layered configuration with an intermediate layer being formed of a damping material disposed between rigid metal layers. As a result the various layers may become electrically insulated from each other. Various configurations have been implemented to electrically ground such rigid metal layers so as to mitigate against any undesirable static discharge events. Grounding configurations have included use of metal fasteners (such as screws) through the various layers to provide electrical grounding of such layers to the disk drive base and other disk drive components (e.g., a pivot bearing cartridge or a spindle motor shaft). However, the lowermost layer may be coated with an electrically insulative coating (such as e-coat) for cleanliness purposes within the disk drive. This would make grounding of such lowermost layer difficult. Other electrical grounding configurations have included selectively exposing the metal layers to each other by not including a portion of damping material at such locations. However, this would preclude utilization of prefabricated solid sheets of laminated metal and damping material that may be readily stamped to form disk drive cover units. Accordingly, there is a need for an improved disk drive cover configuration in comparison to the prior art.

SUMMARY OF THE INVENTION

According to an aspect of the present invention, there is provided a disk drive cover. The disk drive cover includes a bottom layer including a metallic bottom layer body and a first flap formed in the bottom layer body. The first flap defines an exposed inner body edge of the bottom layer body, the bottom layer body including opposing bottom layer first and second surfaces. The disk drive cover further includes a damping layer disposed adjacent the bottom layer first surface. The disk drive cover further includes a top layer including a metallic top layer body and a second flap. The top layer body includes opposing top layer first and second surfaces with the top layer second surface disposed adjacent the damping layer electrically insulating the top layer second surface and the bottom layer first surface therebetween. The second flap is formed in the top layer body with the second flap extending into the bottom layer adjacent the first flap. The second flap defines an exposed second flap edge. The second flap edge is disposed in mechanical communication with the exposed inner body edge for electrically grounding the top and bottom layers.

According to various embodiments, the first flap may be formed between a pair of parallel first slots formed in the bottom layer body. The second flap may be formed between a pair of parallel second slots formed in the top layer body. The first flap may include a first flap crease disposed orthogonal to the parallel first slots. The second flap may include a second flap crease disposed orthogonal to the parallel second slots. The first and second flaps may be generally rectangular shaped. The first and second flaps may be generally V-shaped. The disk drive cover may further include an electrically insulative coating disposed on the top and bottom layers.

According to another aspect of the present invention, there is a disk drive. The disk drive includes a disk drive base, a disk rotatably coupled to the disk drive base, and an actuator disposed adjacent the disk and rotatably coupled to the disk base. The disk drive further includes a cover attached to the disk drive base enclosing the disk and the actuator between the cover and the disk drive base. The cover is as discussed above.

According to another aspect of the present invention, there is provided a method of manufacturing a disk drive cover. The method includes providing a bottom layer including a metallic bottom layer body. The bottom layer body includes opposing bottom layer first and second surfaces. The method further includes providing a damping layer adjacent the bottom layer first surface. The method further includes providing a top layer including a metallic top layer body. The top layer body including opposing top layer first and second surfaces with the top layer second surface disposed adjacent the damping layer electrically insulating the top layer second surface and the bottom layer first surface therebetween. The method further includes shearing the bottom layer body to form a first flap in the bottom layer body with the first flap extending away from the top layer. The first flap defines an exposed inner body edge of the bottom layer body. The method further includes shearing the top layer body to form a second flap in the top layer body. The second flap defines an exposed second flap edge with the second flap extending into the bottom layer adjacent the first flap. The exposed second flap edge is disposed in mechanical communication with the inner body edge for electrically grounding the top and bottom layers.

According to various embodiments, the top and bottom layers may be initially provided as attached to each other.

The shearing of the top layer body and the bottom layer body may be performed during the same shearing operation. The method may include bending the first flap towards the top layer body for deforming the exposed second flap edge with the inner body edge while maintaining the second flap extended into the bottom layer. The method may further include coating the top and bottom layers with an electrically insulative coating.

BRIEF DESCRIPTION OF THE DRAWINGS

FIG. 2 is an enlarged exploded perspective view of the disk drive cover of FIG. 1;

FIG. 3 is an enlarged perspective view of a lower left portion of the disk drive cover of FIG. 2 as assembled;

FIG. 4 is a top plan view of the cover;

FIG. 5 is an enlarged top plan view of the portion of the cover of FIG. 3;

FIG. 6 is a cross sectional side view of a portion of the cover as seen along axis 6-6 of FIGS. 3 and 5;

FIG. 7 is a cross sectional side view of a portion of the cover as seen along axis 7-7 of FIGS. 3 and 5;

FIG. 8 is an exploded cross sectional side view of the portion of the cover of FIG. 7;

FIG. 9 is a cross sectional side view of a portion of the cover as seen along axis 9-9 of FIG. 3; and FIG. 10 is a cross sectional side view of the portion of the cover of FIG. 6, however as such portion appears prior to being finally manufactured.

DESCRIPTION OF THE PREFERRED EMBODIMENTS

Figure 1:
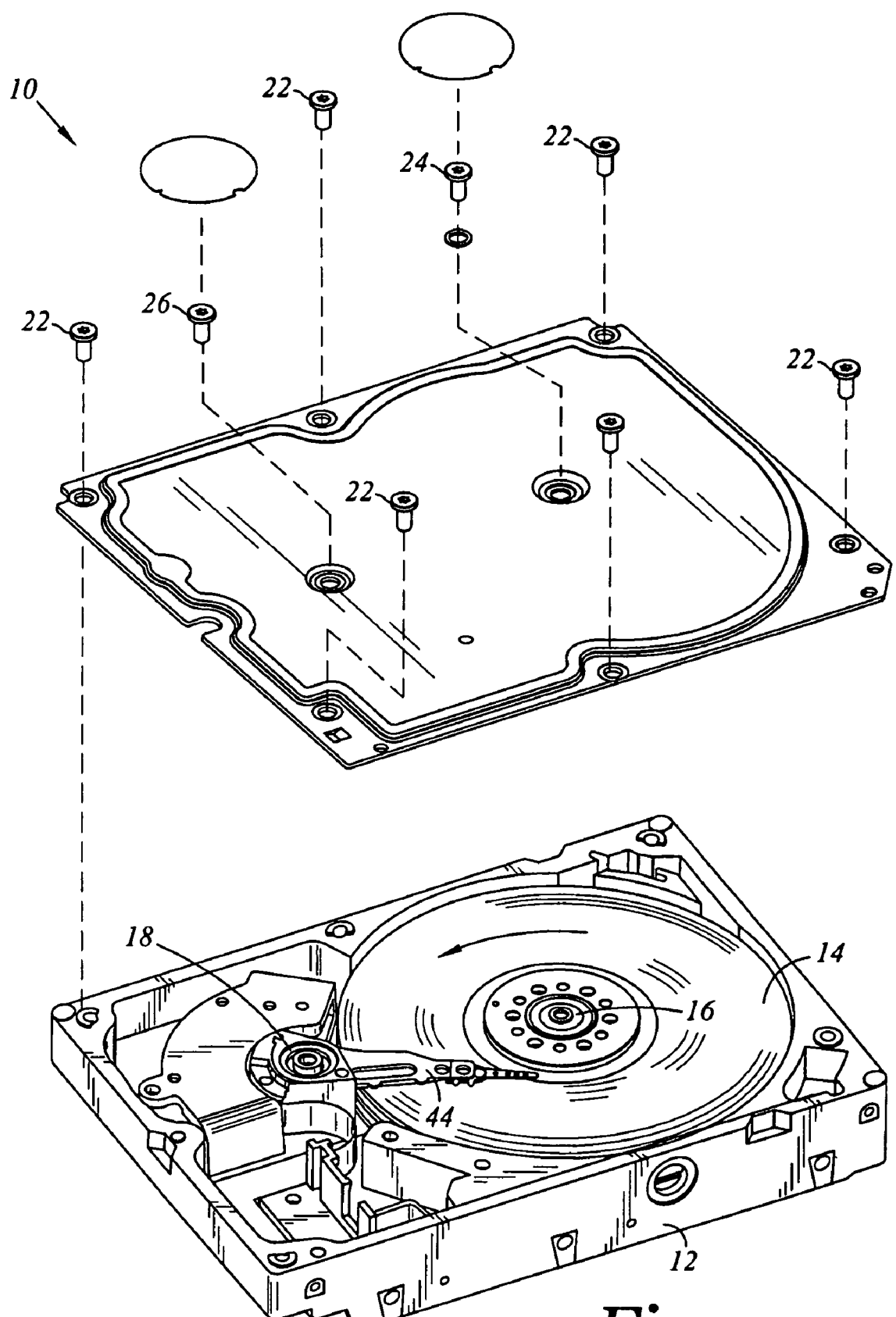
FIG. 1 is a perspective view of a disk drive with a disk drive cover exploded from the other disk drive components in accordance with an aspect of the present invention.

Referring now to the drawings wherein the showings are for purposes of illustrating preferred embodiments of the present invention only, and not for purposes of limiting the same, FIGS. 1-10 illustrate a disk drive including a cover in accordance with aspects of the present invention.

Referring now to FIG. 1, there is depicted a perspective view of a disk drive 10. The disk drive 10 includes a disk drive base 12, a disk 14 rotatably coupled to the disk drive base 12. The disk 14 is supported by a spindle motor 16 that is configured to rotate the disk 14. The disk drive 10 further includes an actuator 18 disposed adjacent the disk 14 and rotatably coupled to the disk base 12. The disk drive 10 further includes a disk drive cover 20 attached to the disk drive base 12 enclosing the disk 14 and the actuator 18 between the cover 20 and the disk drive base 12. Cover fasteners 22, such as screws, may be used to attach the cover 20 to the disk drive base 12. A spindle motor fastener 24 may be further provided to engage the spindle motor 16 through the cover 20. An actuator fastener 26 may be further provided to engage the actuator 18 through the cover 20.

Referring now to FIG. 2 there is depicted an enlarged exploded perspective view of the disk drive cover 20 of FIG. 1. The disk drive cover 20 includes a bottom layer 28, a damping layer 30 and a top layer 32. The bottom layer 28 includes a first flap 34, and the top layer 32 includes a second flap 36. The bottom layer 28 is disposed adjacent the disk drive base 12 when the cover 20 is attached to the disk drive base 12. The bottom and top layers 28, 32 may be formed of a metal material. The damping layer 30 is disposed between the bottom and top layers 28, 32. Such interposition of the damping layer 30 is contemplated to mitigate vibration of the cover 20. Such damping layer 30 may be electrically insulative. In this regard, the bottom and top layers 28, 32 may become electrically insulated from each other. As will be discussed in detail below, utilization of the first and second flaps 34, 36 facilitates electrically grounding the bottom and top layers 28, 32 to each other.

The bottom and top layers 28, 32 may be formed of a metal material, such as a stainless steel material or an aluminum material for examples. The bottom and top layers 28, 32 may be formed according to any of those methods which are well known to one of ordinary skill in the art such as being stamped. In addition, the bottom and top layers may be coated or painted, such as with an electrically insulative e-coat for example. The damping layer 30 is contemplated to have damping properties that are greater than those of the bottom and top layers 28, 32 and may be formed of materials that are well known to one of ordinary skill in the art. In this regard, the damping layer 30 may be formed of a viscoelastic material. Other materials may include foam or rubber for examples.

Referring now to FIG. 3 there is depicted an enlarged perspective view of a lower left portion of the disk drive cover 20 of FIG. 2 as assembled. FIG. 4 is a top plan view of the cover 20. FIG. 5 is an enlarged top plan view of the portion of the cover 20 of FIG. 3. FIG. 6 is a cross sectional side view of a portion of the cover 20 as seen along axis 6-6 of FIGS. 3 and 5. FIG. 7 is a cross sectional side view a portion of the cover as seen along axis 7-7 of FIGS. 3 and 5. FIG. 8 is an exploded cross sectional side view of the portion of the cover 20 of FIG. 7. FIG. 9 is a cross sectional side view a portion of the cover 20 as seen along axis 9-9 of FIG. 3.

Referring additionally to FIGS. 3-9, according to an aspect of the present invention, there is provided the disk drive cover 20. The disk drive cover 20 includes the bottom layer 28 including a metallic bottom layer body 38 and the first flap 34 formed in the bottom layer body 38. The first flap 34 defines an exposed inner body edge 39 of the bottom layer body 38 as seen in FIG. 6. The bottom layer body 38 includes opposing bottom layer first and second surfaces 40, 42 as shown in FIGS. 7 and 8. The disk drive cover 20 further includes the damping layer 30 disposed adjacent the bottom layer first surface 40.

The disk drive cover 20 further includes the top layer 32 including a metallic top layer body 4 and the second flap 36. The top layer body 44 includes opposing top layer first and second surfaces 46, 48 with the top layer second surface 48 disposed adjacent the damping layer 30 electrically insulating the top layer second surface 48 and the bottom layer first surface 40 therebetween as illustrated by FIGS. 7 and 8. The second flap 36 is formed in the top layer body 44 with the second flap 36 extending into the bottom layer 28 adjacent the first flap 34. The second flap 36 defines an exposed second flap edge 68 as seen in FIG. 9. The second flap edge 68 is disposed in mechanical communication with the exposed inner body edge 39 for electrically grounding the top and bottom layers 32, 28.

In further detail according to various embodiments, the first flap 34 may be formed between a pair of parallel first shearlines 50, 52 formed in the bottom layer body 38. The second flap 36 may be formed between a pair of parallel second shearlines 54, 56 formed in the top layer body 44. As mention above, the first flap 34 defines an exposed inner body edge 39 of the bottom layer body 38 as seen in FIG. 6. In this regard, the exposed inner body edge 39 is disposed at the first flap shearline 50, as well as, another inner body edge 45 associated with the top layer body 44. Further as mentioned above, the second flap 36 defines the exposed second flap edge 68 as seen in FIG. 9. In this regard, the exposed second flap edge 68 is disposed at the first flap shearline 50, as well as, another second flap edge 66 associated with the bottom layer body 38.

The first flap 34 may include a first flap crease 62 disposed orthogonal to the parallel first shearlines 50, 52. The second flap may include a second flap crease 64 disposed orthogonal to the parallel second shearlines 54, 56. The first and second flaps 34, 36 may be generally rectangular shaped such as seen from the perspective and top plan views of FIGS. 2-4. It is contemplated that other shapes may be utilized as well. In addition, while the first and second flaps 34, 36 are shown as respectively attached to the bottom and top layer bodies 38, 44 at opposing ends other configurations are contemplated. For example, only a single side may be attached with the flaps in a swing door-like configuration. Further, the first and second flaps 34, 36 may be generally V-shaped such as seen from the side views of FIGS. 6 and 9. However, other cross sectional shapes may be utilized as well such as more rounded U-shape.

The bottom layer 28 is shown as disposed towards the disk drive base 12 with the first and second flaps 34, 36 extending towards the disk drive base 12 in an inner facing manner. In this regard, the flaps 34, 36 would not present a protrusion that could be caught by a user or other external object. However, the cover 20 could be oriented with the top layer 32 disposed towards the disk drive base 12 (i.e., the first and second flaps 34, 36 disposed outwardly from the disk drive base 12).

According to another aspect of the present invention, there is a disk drive. The disk drive includes the disk drive base 12, the disk 14 rotatably coupled to the disk drive base 12, and the actuator 18 disposed adjacent the disk 14 and rotatably coupled to the disk drive base 12. The disk drive 10 further includes the cover 20 attached to the disk drive base 12 enclosing the disk 14 and the actuator 18 between the cover 20 and the disk drive base 12. The cover 20 is as discussed above.

According to another aspect of the present invention, there is provided a method of manufacturing the disk drive cover 20. The method includes providing the bottom layer 28 including the metallic bottom layer body 38. The bottom layer body 38 includes the opposing bottom layer first and second surfaces 40, 42. The method further includes providing a damping layer 30 adjacent the bottom layer first surface 40. The method further includes providing a top layer 32 including a metallic top layer body 44. The top layer body 44 includes opposing top layer first and second surfaces 46, 48 with the top layer second surface 48 disposed adjacent the damping layer 30 electrically insulating the top layer second surface 48 and the bottom layer first surface therebetween 40. The method further includes shearing the bottom layer body 38 to form the first flap 34 in the bottom layer body 38 with the first flap 34 extending away from the top layer 32. The first flap 34 defines the exposed inner body edge 39 of the bottom layer body 38. The method further includes shearing the top layer body 44 to form the second flap 36 in the top layer body 44. The second flap 36 defines the exposed second flap edge 68 with the second flap 36 extending into the bottom layer 28 adjacent the first flap 34. The exposed second flap edge 68 is disposed in mechanical communication with the inner body edge 39 for electrically grounding the top and bottom layers 32, 28.

According to various embodiments, the top and bottom layers 32, 28 may be initially provided as attached to each other. Moreover, the top and bottom layers 32, 28 may be initially provided with the damping layer 30 disposed therebetween. Such layers 28, 30, 32 may be provided from a stock or roll of material, with individual sections of the cover 20 being stamped from such stock or roll. In this regard, the shearing of the top layer body 44 and the bottom layer body 38 may be performed during the same shearing operation.

Referring now to FIG. 9, the method may initially include shearing the top and bottom layers 32, 28 such as shown. As can be seen extended first and second flaps 58, 60 are formed. Subsequently, the method may provide for bending the first flap 34 from the extended first flap 58 towards to the top layer body 44 for deforming the exposed second flap edge 68 with the inner body edge 39 while maintaining the second flap 36 extended into the bottom layer 38. Finally, the method may further include coating the top and bottom layers 32, 28 with an electrically insulative coating, such as e-coat.

We claim:

1. A disk drive cover comprising:
a bottom layer including a metallic bottom layer body and a first flap formed in the bottom layer body, the first flap defining an exposed inner body edge of the bottom layer body, the bottom layer body including opposing bottom layer first and second surfaces;
a damping layer disposed adjacent the bottom layer first surface; and
a top layer including a metallic top layer body and a second flap, the top layer body including opposing top layer first and second surfaces with the top layer second surface disposed adjacent the damping layer electrically insulating the top layer second surface and the bottom layer first surface therebetween, the second flap being formed in the top layer body with the second flap extending into the bottom layer adjacent the first flap, the second flap defining an exposed second flap edge, the second flap edge being disposed in mechanical communication with the exposed inner body edge for electrically grounding the top and bottom layers.

2. The disk drive cover of claim 1 wherein the first flap is formed between a pair of parallel first shearlines formed in the bottom layer body, the second flap is formed between a pair of parallel second shearlines formed in the top layer body.

3. The disk drive cover of claim 2 wherein the first flap includes a first flap crease disposed orthogonal to the parallel first shearlines, the second flap includes a second flap crease disposed orthogonal to the parallel second shearlines.

4. The disk drive cover of claim 1 wherein the first and second flaps are generally rectangular shaped.

5. The disk drive cover of claim 4 wherein the first and second flaps are generally V-shaped.

6. The disk drive cover of claim 1 further includes an electrically insulative coating disposed on the top and bottom layers.

7. A disk drive comprising:
a disk drive base;
a disk rotatably coupled to the disk drive base;
an actuator disposed adjacent the disk and rotatably coupled to the disk base; and
a cover attached to the disk drive base enclosing the disk and actuator between the cover and the disk drive base, the cover comprising:
a bottom layer including a metallic bottom layer body and a first flap formed in the bottom layer body, the first flap defining an exposed inner body edge of the bottom layer body, the bottom layer body including opposing bottom layer first and second surfaces;

a damping layer disposed adjacent the bottom layer first surface; and a top layer including a metallic top layer body and a second flap, the top layer body including opposing top layer first and second surfaces with the top layer second surface disposed adjacent the damping layer electrically insulating the top layer second surface and the bottom layer first surface therebetween, the second flap formed in the top layer body with the second flap extending into the bottom layer adjacent the first flap, the second flap defining an exposed second flap edge, the second flap edge being disposed in mechanical communication with the exposed inner body edge for electrically grounding the top and bottom layers.

8. The disk drive of claim 7 wherein the first flap is formed between a pair of parallel first slots formed in the bottom layer body, the second flap is formed between a pair of parallel second slots formed in the top layer body.

9. The disk drive of claim 8 wherein the first flap includes a first flap crease disposed orthogonal to the parallel first slots, the second flap includes a second flap crease disposed orthogonal to the parallel second slots.

10. The disk drive of claim 7 wherein the first and second flaps are generally rectangular shaped.

11. The disk drive of claim 10 wherein the first and second flaps are generally V-shaped.

12. The disk drive of claim 7 further includes an electrically insulative coating disposed on the top and bottom layers.

* * * * *